Oct. 18, 1966   H. JONES   3,279,818
MUD FLAPS FOR VEHICLES
Filed Oct. 30, 1964
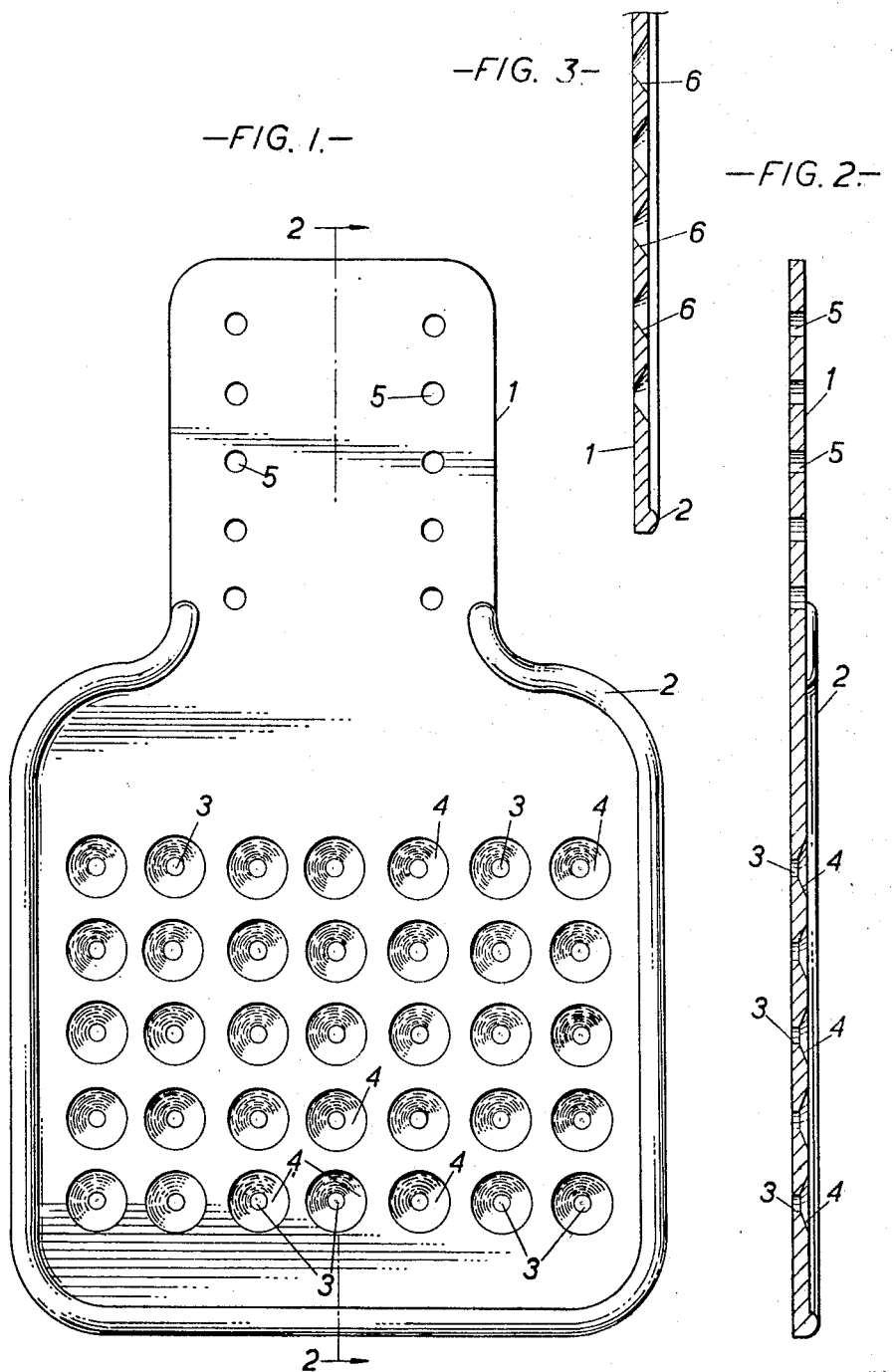
INVENTOR:
HUGH JONES
BY
Shoemaker and Mattare
ATTYS.

United States Patent Office 3,279,818
Patented Oct. 18, 1966

3,279,818
MUD FLAPS FOR VEHICLES
Hugh Jones, Halifax, England, assignor to Kumficar (Sales) Limited, Halifax, England
Filed Oct. 30, 1964, Ser. No. 407,657
10 Claims. (Cl. 280—154.5)

This invention is concerned with improvements in mud flaps for use behind the wheels of a motor road vehicle, in particular (but not exclusively) the rear wheels of the vehicle, so as to prevent the splashing up of dirt and spray. This problem of splash and spray is encountered both with front wheels and with rear wheels, in the former case the car sills and bodywork becoming soiled, and in the latter case following vehicles becoming soiled as well as the rear of the vehicle on which they are fitted.

It is known to provide flaps or rubber or synthetic plastic or like material suspended from inside the rear and of the wings of a vehicle, and to have these flaps of a flexible nature so that they will yield when driven against a kerb or other obstacle. Similar flaps for use on the front wings of a vehicle are also known. Hitherto, however, these devices have not been efficient to the extent which is desirable. At high speeds the air pressure in front of the flaps tends to deflect them rearward and upwards to a position where they are relatively inoperative, and even at lower speeds dirt thrown on to their forward face by the vehicle wheels and which travels downwards to the bottom edge of such face is picked up by the airstream passing underneath such edge, and becomes carried on any surface in their path, such as the front of a following vehicle.

The object of the present invention is to provide improved and more efficient types of mud flap which are free from all said disadvantages.

According to this invention, the flexible flap suspended at the rear end of a vehicle wing is provided with a series of through openings disposed over its surface, and these openings enlarge in cross section towards the rear face of the flap so that air passing through them is subject to a fall in pressure at such rear face, with a consequent reduction of velocity and, as a result any entrained moisture or dirt tends to fall downwards instead of being carried along rearwardly in the air stream.

The said openings may be of any suitable shape and size but usually they will be round holes of relatively small size, for example 3/16" across at the smaller end. They may be of elongated form, as slots, but more usually they will be of localised symmetrical form, generally circular, though they could be triangular, square or polygonal.

In the preferred arrangements the openings are of uniform cross-section for about half the thickness of the flap, from the front face rearwardly, and they then enlarge in cross-section rather quickly up to the rear face. A round hole of 3/16" diameter for example may enlarge into 1" diameter at the actual rear face of the flap.

Any suitable means may be provided for suspending the flaps on the vehicles. They will usually be of synthetic plastic material, of about 3/16" or 1/4" in thickness, and may carry light-reflecting material on the rear face.

There may be a number of rows or holes, say four horizontal rows, with six round holes in a row, or five rows with seven holes in a row, each 3/16" diameter at the front end and enlarging to about 1" at the rear end.

The flaps will usually be made so that they may be cut to any one of a number of different lengths to suit the height at which they are to be hung on the vehicle and will be shaped at each of the points of severance for connection to the hanging means. A common suspension means may therefore be provided for attachment to the top edge of the flap such top edge being either the initial top edge or a new top edge remaining after a part of the original flap has been cut away.

In the accompanying drawing two of the various possible forms of the invention are illustrated. As shown:

FIG. 1 is a rear elevation of a preferred form of the invention;

FIG. 2 is a vertical section on the line 2—2 of FIG. 1; and

FIG. 3 is a vertical section through a modified form of the invention.

The improved flap 1 is a one-piece moulding, generally flap and of uniform thickness except for a beading or rib 2 around its lower part on the rear face. The lower part 2 is of greater width than the upper part and has five horizontal rows of holes each of which has a forward part 3 of uniform diameter and a rearward part 4 of widely tapering form. There are seven holes in each horizontal row. There may be of course other numbers of rows and other numbers of holes in a row. Nor need there be the same number of holes in each row or the same diameter for all the holes.

The narrower upper part of the flap has pairs of holes 5 at different levels by any pair (or more) of which the flap may be suspended from within the wing of a vehicle, either on the wing itself or on any suitable carrier provided for the purpose. If necessary the flap may be shortened by removing the portion above the selected pair of supporting holes and, to facilitate this, the flap may have V grooves or the like across it at levels where a severance is likely to be required.

FIG. 3 illustrates a modification of the invention in which holes 6 in the lower part are of tapering form over the whole of their length instead of having parts of uniform diameter as in FIGS. 1 and 2.

The improved flaps may be easily cleaned by the application of a water jet to dislodge any dirt which may have become trapped in the holes. Instead of being a plastic moulding, or a plain rubber moulding, the flaps may be of a fabric-reinforced rubber or reinforced synthetic material. The holes may be drilled in the material or, when the flap is made by moulding they may be shaped in the mould.

What I claim is:

1. A mudflap for suspension behind a vehicle wheel and comprising a flexible body part adapted to be secured in position relative to the said wheel characterised by the provision of a multiplicity of through openings therein, some at least of the said openings increasing in cross-sectional dimension towards the rear of the flap such that air passing through said openings is subjected to a reduction in pressure.

2. A mudflap as claimed in claim 1 further characterised in that each said opening includes a uniform diameter portion adjacent the front of the flap.

3. A mudflap as claimed in claim 2, further characterised in that each opening is of circular cross-section.

4. A mudflap as claimed in claim 3, further characterised in that the flap is of lesser width at the top than the bottom.

5. A mudflap for suspension behind a vehicle wheel and comprising a flexible body part adapted to be secured in position relative to the said wheel, characterised by the provision of a multiplicity of through openings therein, some at least of the openings increasing in cross-sectional dimension from front to rear of the flaps in such manner that air passing therethrough is subjected to a reduction in pressure.

6. A mudflap as claimed in claim 5 further characterised in that each opening is of circular cross-section.

7. A mudflap as claimed in claim 6, further characterised in that the said body is of a lesser width at the top than the bottom, and a further series of holes is provided in the upper region by which the attachment of the flap relative to a wheel is facilitated.

8. A mudflap for application adjacent to a vehicle road wheel comprising a flexible body part, and a multiplicity of through holes in the said body part, the said holes being arranged in spaced parallel rows and being of increased cross-sectional dimension toward rear of the flap.

9. A mudflap as claimed in claim 8 wherein each said through hole has a first cylindrical portion at the front of the flap and an outwardly divergent portion at the rear thereof.

10. A mudflap as claimed in claim 9 including a further series of holes adapted to facilitate the mounting of the structure relative to a vehicle wheel.

References Cited by the Examiner
UNITED STATES PATENTS

| | | | |
|---|---|---|---|
| 2,619,363 | 11/1952 | Wenham | 280—154.5 |
| 2,865,654 | 12/1958 | Le Compte | 280—154.5 |
| 3,019,031 | 1/1962 | Immel | 280—154.5 |

BENJAMIN HERSH, *Primary Examiner.*

W. A. MARCONTELL, *Assistant Examiner.*